United States Patent
Packer et al.

(10) Patent No.: US 7,225,968 B2
(45) Date of Patent: Jun. 5, 2007

(54) CRACK REPAIR USING FRICTION STIR WELDING ON MATERIALS INCLUDING METAL MATRIX COMPOSITES, FERROUS ALLOYS, NON-FERROUS ALLOYS, AND SUPERALLOYS

(75) Inventors: Scott M. Packer, Alpine, UT (US); Russell J. Steel, Salem, UT (US); Jonathan A. Babb, Kamas, UT (US); Chris Reed, Salem, UT (US); Brian E. Taylor, Draper, UT (US)

(73) Assignees: Sii Megadiamond, Inc., Provo, UT (US); Advanced Metal Products, Inc., West Bountiful, UT (US)

( * ) Notice: Subject to any disclaimer, the term of this patent is extended or adjusted under 35 U.S.C. 154(b) by 27 days.

(21) Appl. No.: 10/912,736

(22) Filed: Aug. 4, 2004

(65) Prior Publication Data
US 2005/0061853 A1 Mar. 24, 2005

(51) Int. Cl.
*B23K 20/12* (2006.01)
(52) U.S. Cl. .................... 228/112.1; 228/2.1; 228/119
(58) Field of Classification Search .................. 228/2.1, 228/112.1, 2.3, 119, 114.5, 234.1, 102, 103; 156/73.5, 580; 51/295
See application file for complete search history.

(56) References Cited

U.S. PATENT DOCUMENTS

| | | | |
|---|---|---|---|
| 4,144,110 A | 3/1979 | Luc | |
| 4,390,775 A * | 6/1983 | Biava et al. | 219/124.34 |
| 4,765,525 A * | 8/1988 | Popp et al. | 228/9 |
| 5,359,172 A * | 10/1994 | Kozak et al. | 219/121.64 |
| 5,460,317 A | 10/1995 | Thomas et al. | |
| 5,611,479 A | 3/1997 | Rosen | |
| 5,697,511 A | 12/1997 | Bampton | |
| 5,713,507 A * | 2/1998 | Holt et al. | 228/112.1 |
| 5,718,366 A | 2/1998 | Colligan | |
| 5,758,999 A | 6/1998 | Geise | |
| 5,769,306 A | 6/1998 | Colligan | |
| 5,789,720 A * | 8/1998 | LaGally et al. | 219/121.64 |
| 5,794,835 A | 8/1998 | Colligan et al. | |
| 5,811,755 A | 9/1998 | McGee | |
| 5,813,592 A | 9/1998 | Midling et al. | |
| 5,829,664 A | 11/1998 | Spinella et al. | |
| 5,971,247 A | 10/1999 | Gentry | |
| 5,971,252 A | 10/1999 | Rosen et al. | |
| 5,975,406 A | 11/1999 | Mahoney et al. | |
| 6,045,027 A | 4/2000 | Rosen et al. | |
| 6,045,028 A | 4/2000 | Martin et al. | |

(Continued)

FOREIGN PATENT DOCUMENTS

EP    0 797 043 A2    9/1997

(Continued)

*Primary Examiner*—Kevin Kerns
*Assistant Examiner*—Michael Aboagye
(74) *Attorney, Agent, or Firm*—Morriss O'Bryant Compagni

(57) ABSTRACT

A system and method of using friction stir welding and friction stir processing to perform crack repair or preventative maintenance of various materials and structures, wherein the structures include pipeline, ships, and nuclear reactor containment vessels, wherein the friction stir welding and processing can be performed on various materials including metal matrix composites, ferrous alloys, non-ferrous alloys, and superalloys, and wherein the friction stir welding and processing can be performed remotely and in harsh environments such as underwater or in the presence of radiation.

7 Claims, 4 Drawing Sheets

U.S. PATENT DOCUMENTS

| | | | |
|---|---|---|---|
| 6,050,474 | A | 4/2000 | Aota et al. |
| 6,050,475 | A | 4/2000 | Kinton et al. |
| 6,051,325 | A | 4/2000 | Talwar et al. |
| 6,053,391 | A | 4/2000 | Heideman et al. |
| 6,060,686 | A * | 5/2000 | Jones .................... 219/121.84 |
| 6,070,784 | A | 6/2000 | Holt et al. |
| 6,138,895 | A | 10/2000 | Oelgoetz et al. |
| 6,168,066 | B1 | 1/2001 | Arbegast |
| 6,168,067 | B1 | 1/2001 | Waldron et al. |
| 6,173,880 | B1 | 1/2001 | Ding et al. |
| 6,193,137 | B1 | 2/2001 | Ezumi et al. |
| 6,206,268 | B1 | 3/2001 | Mahoney |
| 6,421,578 | B1 * | 7/2002 | Adams et al. ............... 700/212 |
| 6,492,618 | B1 * | 12/2002 | Flood et al. ............ 219/125.11 |
| 6,497,355 | B1 * | 12/2002 | Ding et al. .................. 228/102 |
| 6,528,754 | B2 * | 3/2003 | Okada et al. ............ 219/121.6 |
| 6,648,206 | B2 * | 11/2003 | Nelson et al. ........... 228/112.1 |
| 6,726,084 | B2 * | 4/2004 | Duncan, Jr. .............. 228/112.1 |
| 6,779,704 | B2 * | 8/2004 | Nelson et al. ........... 228/112.1 |
| 6,866,181 | B2 * | 3/2005 | Aota et al. ............... 228/112.1 |

FOREIGN PATENT DOCUMENTS

| | | |
|---|---|---|
| EP | 0 810 054 A1 | 12/1997 |
| EP | 0 833 097 A2 | 4/1998 |
| EP | 0 867 254 A1 | 9/1998 |
| EP | 0 810 056 A3 | 12/1998 |
| EP | 0 888 843 A1 | 1/1999 |
| EP | 0 893 189 A2 | 1/1999 |
| EP | 0 893 190 A2 | 1/1999 |
| EP | 0 925 964 A2 | 6/1999 |
| EP | 0 928 659 A1 | 7/1999 |
| EP | 0 947 280 A1 | 10/1999 |
| EP | 0 810 055 B1 | 12/1999 |
| EP | 0 968 788 A2 | 1/2000 |
| EP | 0 972 605 A2 | 1/2000 |
| EP | 0 985 483 A2 | 3/2000 |
| EP | 0 992 314 A2 | 4/2000 |
| EP | 1147846 A1 * | 4/2000 |
| EP | 1 029 627 A1 | 8/2000 |
| EP | 1 046 453 A2 | 10/2000 |
| EP | 1 048 390 A2 | 11/2000 |
| EP | 1 055 478 A1 | 11/2000 |
| EP | 1 057 572 A2 | 12/2000 |
| EP | 1 057 573 A2 | 12/2000 |
| EP | 1 057 574 A2 | 12/2000 |
| EP | 1 057 575 A2 | 12/2000 |
| EP | 1 057 576 A2 | 12/2000 |
| GB | 2 306 366 A | 5/1997 |
| WO | WO 93/10935 | 6/1993 |
| WO | WO 97/15462 | 5/1997 |
| WO | WO 97/48517 | 12/1997 |
| WO | WO 98/13167 | 4/1998 |
| WO | WO 98/45080 | 10/1998 |
| WO | WO 98/51441 | 11/1998 |
| WO | WO 98/58759 | 12/1998 |
| WO | WO 99/32254 | 7/1999 |
| WO | WO 99/32255 | 7/1999 |
| WO | WO 99/33594 | 7/1999 |
| WO | WO 99/34951 | 7/1999 |
| WO | WO 99/39861 | 8/1999 |
| WO | WO 99/52669 | 10/1999 |
| WO | WO 99/54081 | 10/1999 |
| WO | WO 99/58288 | 11/1999 |
| WO | WO 99/65637 | 12/1999 |
| WO | WO 00/02698 | 1/2000 |
| WO | WO 00/02699 | 1/2000 |
| WO | WO 00/02704 | 1/2000 |
| WO | WO 00/03818 | 1/2000 |
| WO | WO 00/56497 | 9/2000 |

* cited by examiner

CRACK REPAIR USING FRICTION STIR WELDING ON MATERIALS INCLUDING METAL MATRIX COMPOSITES, FERROUS ALLOYS, NON-FERROUS ALLOYS, AND SUPERALLOYS

CROSS REFERENCE TO RELATED APPLICATIONS

This document incorporates by reference all of the subject matter filed in U.S. patent Ser. No. 6,648,206, in U.S. patent application Ser. No. 09/851,597 (now allowed), and in U.S. patent application Ser. No. 10/846,825.

BACKGROUND OF THE INVENTION

1. Field of the Invention

This invention relates generally to friction stir welding wherein heat for creating a weld is generated by plunging a rotating pin of a tool into a workpiece. More specifically, the present invention relates to performing crack repair, crack prevention, and material conditioning in a friction stir welding process that enables the present invention to repair or perform pre-emptive maintenance on materials that are welded, wherein the present invention is particularly applicable to the repair and maintenance of pipes, and has important applicability to the nuclear energy industry.

2. Description of Related Art

Crack formation and propagation is a serious problem in many applications that use metal and alloy structures and components. For example, pipes used in the exploration for and transportation of gas and petrochemicals are in constant need of replacement and repair. Furthermore, thousands of miles of new pipes are being manufactured and installed every year.

It is well known in the industry that crack initiation can be a result of loading, hydrogen embrittlement, corrosion, stress corrosion, material defects, and especially fusion welding defects. In particular, the process of fusion welding introduces residual stresses caused by solidification of a liquid phase, solidification cracking, porosity, large grain sizes prone to grain boundary corrosion, and crack initiation sites that originate from the heat affected zone. As a general rule of thumb, it can be assumed that fusion welding reduces the physical properties of the base metal by some 30% to 40%. The reason for the reduction in physical properties and creation of crack initiation sites is due to the introduction of defects and the altered grain structure of the metal or alloy from the fusion welding process.

While a need has been established to friction stir weld high melting temperature alloys for improved properties (making it possible to achieve 95%+ base metal properties), a methodology has not yet been established to repair cracks, except in aluminum alloys.

Accordingly, what is needed is a system and method for repairing cracks in metal matrix composites, ferrous alloys, non-ferrous alloys, and superalloys. What is also needed is a system and method for performing crack prevention on these materials and aluminum.

Another aspect of the invention relates to its applicability to use in environments that are difficult to perform any type of welding. For example, fusion welding is not a viable process for repairing welds in fluid or underwater environments. Fusion welding is even difficult to perform in air environments because of the cast structure that is created from a molten phase, and the accompanying defects. Fusion welding repair is at best a temporary solution to cracks since the process adds more defects to an already defect prone welding area.

Failure of pipes or other structures that are subject to the effects of crack propagation is a problem with serious consequences not only for the environment, but the health of workers. For example, consider a nuclear containment vessel. Leaks in such an environment can have serious health consequences for those involved.

Accordingly, it would be an advantage over the prior art to provide a system for friction stir welding in such environments, not only to repair cracks, but to also perform preventative maintenance.

BRIEF SUMMARY OF THE INVENTION

It is an object of the present invention to provide a system and method that enables repair of cracks by using friction stir welding of MMCs, ferrous alloys, and superalloys, as well as non-ferrous alloys.

It is another object to provide a system and method that enables preventing crack initiation and propagation by using friction stir welding.

It is another object to provide a system and method that enables repair and maintenance of pipes, ships, and other structures using friction stir welding.

It is another object to provide a system and method that enables repair and prevention of cracks in harsh environments, including underwater and nuclear environments.

It is another object to provide a system and method for remotely controlling friction stir welding of structures.

It is another object to provide a system and method for friction stir welding by wireless or wired control systems.

It is another object to provide a system and method for friction stir welding that utilizes a run-off tab to avoid holes in the subject material being modified or repaired.

It is another object to provide a system and method for friction stir processing that utilizes a tool without a pin.

In a preferred embodiment, the present invention is a system and method of using friction stir welding and friction stir processing to perform crack repair or preventative maintenance of various materials and structures, wherein the structures include pipe, ships, and nuclear containment structures, wherein the friction stir welding and processing can be performed on various materials including metal matrix composites, ferrous alloys, non-ferrous alloys, and superalloys, and wherein the friction stir welding and processing can be performed remotely and in harsh environments such as underwater or in the presence of radiation.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Figure 1:
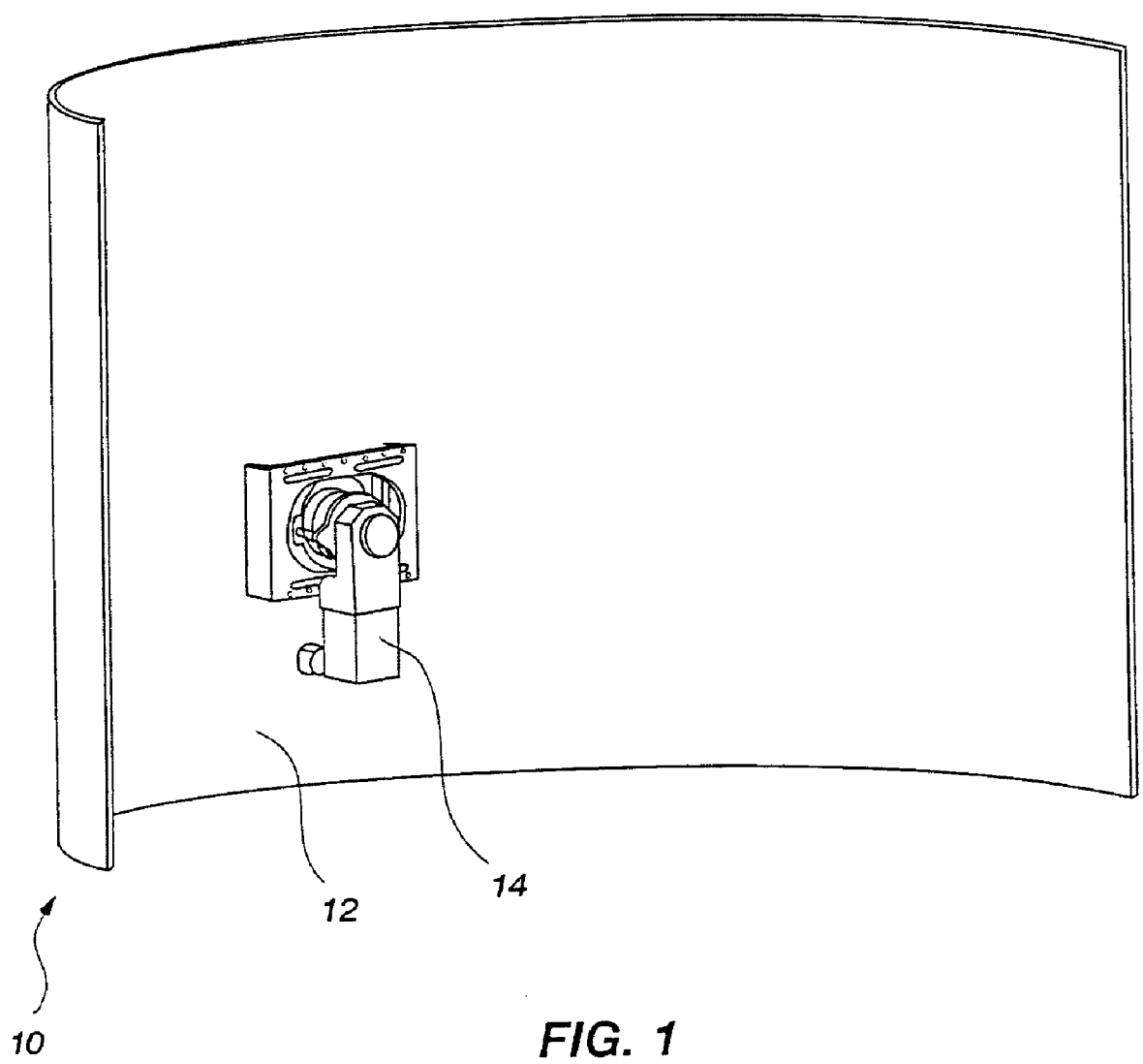
FIG. 1 is a perspective view of a remote friction stir welding system being used on a curved surface.

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

The presently preferred embodiment of the invention is a system and method for using friction stir welding and friction stir processing to repair cracks and inhibit crack initiation. Furthermore, the present invention can perform these functions on materials that are functionally unweldable in the state of the art. Thus, these functions can be performed on metal matrix composites, ferrous alloys, non-ferrous alloys, and superalloys when using a superabrasive tool.

The present invention makes possible crack repair in high melting temperature alloys as a result of PCBN tool technology. The patent references that are incorporated by reference teach how a polycrystalline cubic boron nitride (PCBN) can be used to perform friction stir welding of metal matrix composites, ferrous alloys, non-ferrous alloys, and superalloys. This same PCBN tool and modified PCBN tools to be disclosed herein, in conjunction with tool holding technology, cooling technology, and machine control technology can now be used to perform crack repair using state of the art motion and force control hardware and software.

As stated previously, fusion welding is not a viable process for repairing welds in fluid or underwater environments. Furthermore, fusion welding is difficult to perform even in air environments because of the cast structure that is a result of a molten phase with its accompanying defects. However, friction stir welding repair is a viable method to repair existing cracks in ships, above-ground pipelines, underwater pipelines, nuclear reactor containment structures, and any other structural components where cracking is present.

The potential benefits to the pipeline industry are especially compelling. For example, the superior welds that result from friction stir welding will obviously result in better new pipelines as they are manufactured and installed. For example, consider the phenomenon that is known in the welding industry as a kissing bond. That is, at the weld root a very short length of the weld interface, as small as 30 to 50 micrometers, may be in intimate contact but without true metallurgical bonding. Even this small flaw can drastically reduce mechanical properties. However, using the improved machine control technology that provides motion and force control hardware and software as described in the provisional patent application incorporated by reference above, improved friction stir welds will result in a superior pipeline product from the beginning.

But there are thousands of miles of existing pipeline with cracks and poor fusion welds already in place throughout the world. The existing pipeline can also benefit from the present invention when it is used to repair cracks. Thus, the present invention includes the ability to repair cracks on curved surfaces, such as the outside diameter (OD) and the inside diameter (ID) of the pipeline.

Furthermore, an important aspect of the present invention is to enable remote repair. This need is demonstrated by the location of some of the pipelines that require repair. The environment may be too small for a person to gain access, or too hazardous for a person to enter.

Regarding hazardous environments, an example that illustrates the importance of remote crack repair is in a nuclear reactor containment vessel that holds the water surrounding nuclear fuel rods. A stainless steel containment vessel, typically 12 to 15 feet in diameter and 15 to 20 feet tall, is subjected to elevated temperatures over several years. These containment vessels have now begun to exhibit stress corrosion cracking as a result of fusion welds, exposure to hydrogen from the water, and corrosion. If the containment vessel cracks such that a leak occurs, serious health consequences may result from radioactive leakage. It is also much more difficult, if not impossible, to repair or replace a leaking containment vessel.

At the present time, approximately 18 of 20 nuclear power plants have been shut down in Japan because of crack initiation and propagation in the primary containment vessel. Furthermore, at least Japan, France, Germany, and the United States are entering a serious nuclear waste containment problem without the ability to repair cracking in the containment vessels. Fusion welding is not an option for repair because of the introduction of new stress corrosion sites.

An important aspect of the present invention is to provide a remote controlled friction stir welding (FSW) spindle head that will be inserted into the containment vessel, attached to the containment vessel using suction or other mechanical means, and then operated remotely to repair cracks using the FSW process as explained in the incorporated references.

Figure 2:
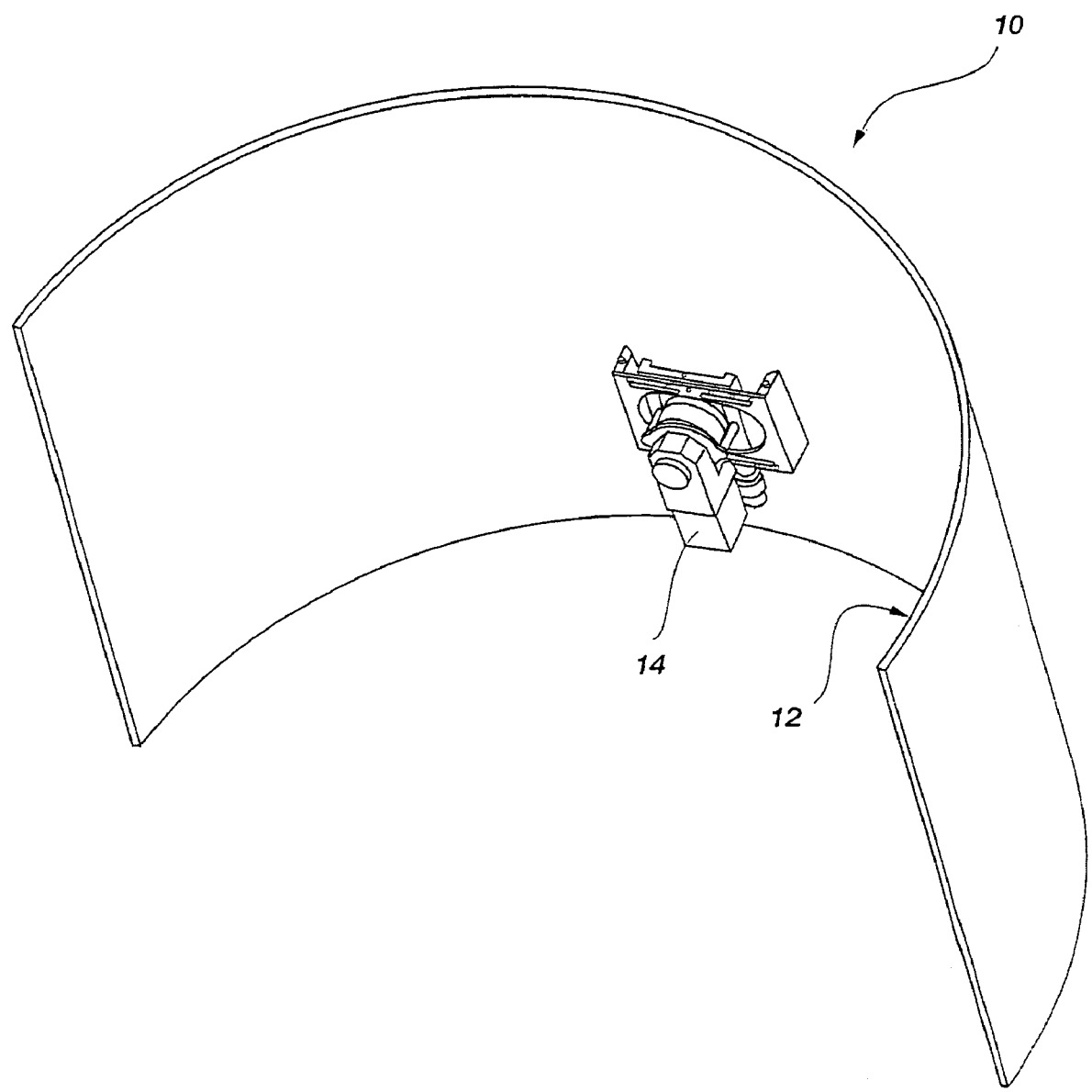
FIG. 2 is a different perspective view of a remote friction stir welding system being used on a curved surface.
Figure 3:
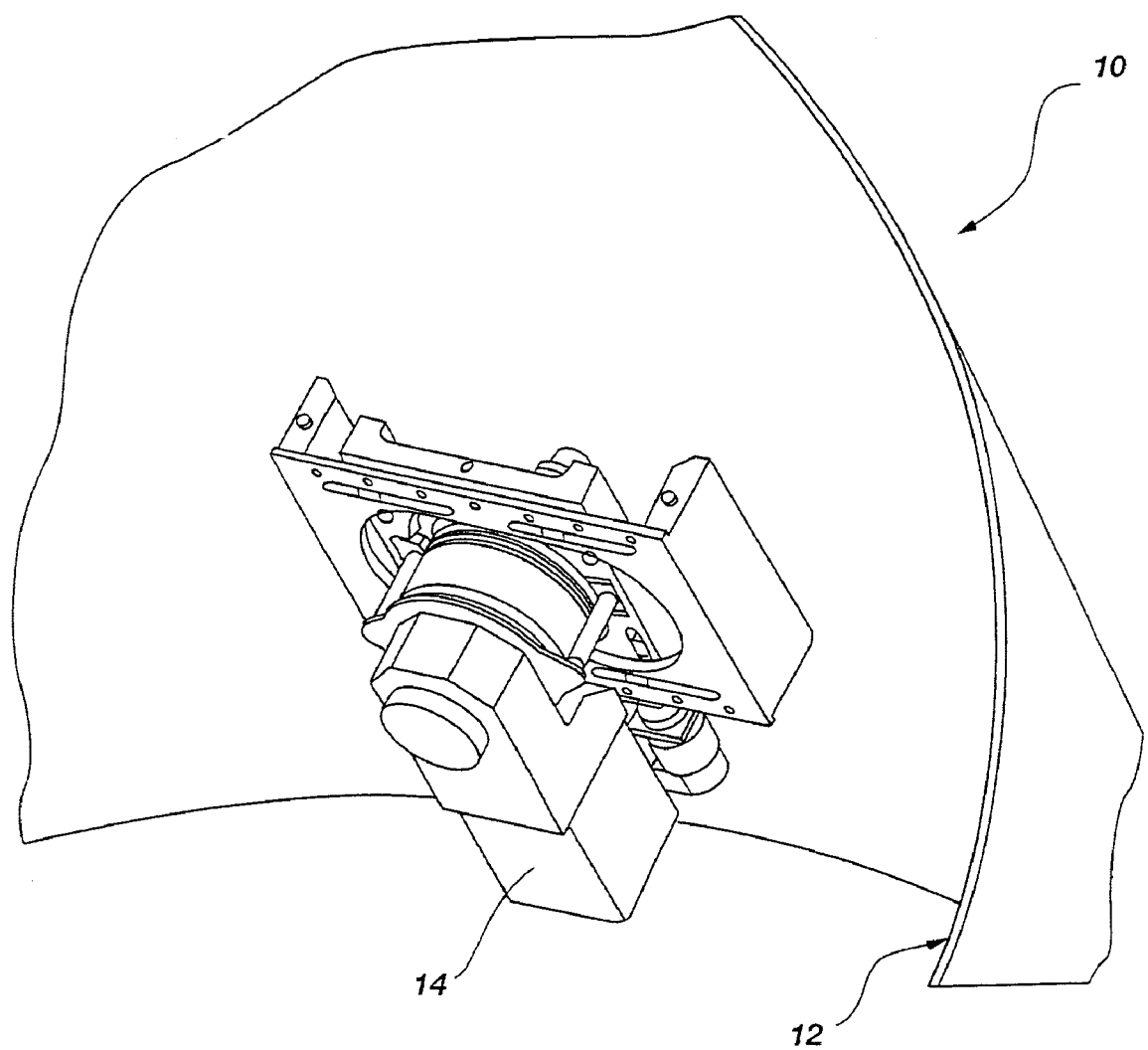
FIG. 3 is a close-up perspective view of a remote friction stir welding system being used on a curved surface.

The concept of remote operation of a FSW spindle head is illustrated in accompanying FIGS. 1, 2 and 3. The ID and OD of pipeline and containment vessels can be repaired using a spindle head attached to the surface. In many cases, a mandrel is not necessary because the surface of the structure needs to be penetrated as little as ½ mm with the FSW tool to follow along the crack and repair it.

Accordingly, FIG. 1 is a perspective view of the ID 12 of a nuclear containment vessel 10. A spindle head assembly 14 is shown attached to the ID 12 of the nuclear containment vessel 10. The spindle head assembly 14 is attached with sufficient force such that the tool in the spindle head assembly 14 can be pressed against and thereby at least partially penetrate the surface of the nuclear containment vessel 10. The partial penetration is necessary in order for the tool to modify the material of the nuclear containment vessel 10. By partially penetration the material, the tool of the spindle head assembly 14 is able to anneal cracks or other defects in the surface.

It is necessary for the spindle head assembly 14 to be able to move along whatever surface to which it has been attached. Accordingly, any such method for tractoring, sliding, pushing, or pulling the spindle head assembly 14 and understood by those skilled in the art can be used.

In order to prevent leaving a hole in the pipeline or the containment vessel by a pin of the FSW tool in the spindle head assembly 14 once it has completed its task, a run-off tab can be used to eliminate a void that would otherwise be left by the pin. However, it is noted that in many cases, this void can be left in the structure where the crack is being repaired because there are no sharp radii left by the pin. Any curved or flat surface can be repaired using the present invention.

The concept of a remote controlled FSW spindle head assembly 14 could take advantage of wired or wireless technologies to enable bi-directional communication with the remote controlled FSW spindle head assembly 14.

Wireless communication may take the form of infra-red, radio or optical methods of communication. These should not be considered to be limiting factors of remote communication. It is more likely that the environment in which the spindle head assembly 14 is being operated will dictate the method of communication with the spindle head assembly.

Another important aspect of the invention is the use of friction stir processing, as opposed to welding, to process or condition the surface of the structure that is being worked on. For example, heat checking is known to those skilled in the art of manufacturing as microscopic surface cracking, generally caused by grinding or other manufacturing processes, or even from exposure to the environment. The terms of processing and conditioning are used to refer to the affect created by pressing a FSW welding tool against a surface of a structure without actually plunging a pin into the structure.

The friction stir processing affect is understood by those skilled in the art as inducing directed, localized, and controlled materials processing in any arbitrary location and pattern. To make this processing easier, it is envisioned that a FSW tool, capable of processing metal matrix composites, ferrous alloys; non-ferrous alloys, and superalloys, would be comprised of an FSW tool, but either with or without a pin.

Figure 4:
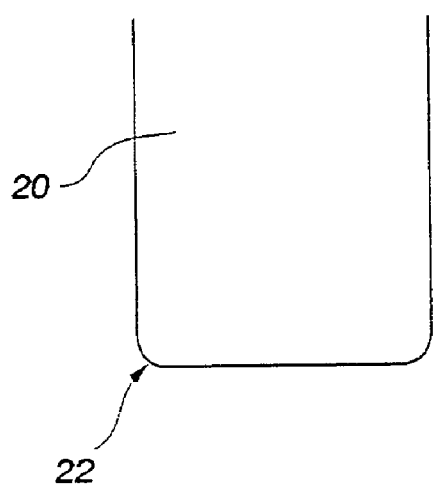
FIG. 4 is a profile view of a friction stir welding tool having no pin.

As shown in FIG. 4, an FSW tool 20 without a pin would thus rely on a broader surface to perform the processing, wherein the shoulder 22 of the tool would be pressed against the structure to be processed. The shoulder 22 of the tool 20 without a pin would enter approximately 20 to 40 thousandths of an inch into the material. The advantage of not having a pin in the tool 20 is that a broader area of coverage can be obtained when relying on contact of only the shoulder 22.

Figure 5:
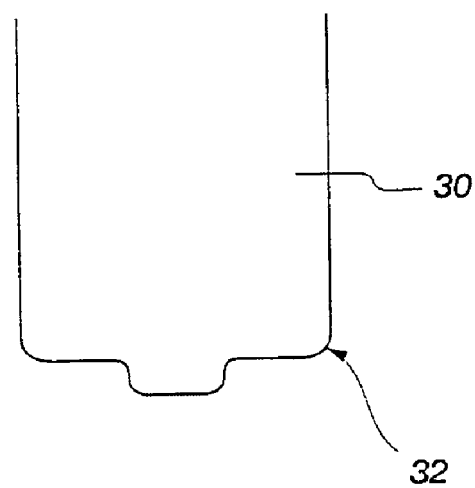
FIG. 5 is a profile view of a friction stir welding tool having a pin that is shorter than conventional pins.

In contrast, FIG. 5 shows an FSW tool 30 having a pin 32. The length of the pin 32 could be substantially shortened from conventional pins used in other FSW tools. The reasons for shortening the length of the pin 32 are, for example, to try and broaden the area of coverage because more of the shoulder 32 is likely to be in contact with the material being processed. This broadened coverage might also result even though some penetration of the pin 32 into the material being processed is desired. Thus, the tool 30 of FIG. 5 will also work better than the tool 20 of FIG. 4 when some penetration is required.

Regarding underwater repair of pipeline, or repair of containment vessels that have water in them, it is envisioned that the FSW crack repair or processing could take place even when the spindle head assembly 14 is surrounded by the water, or within an evacuated space around the crack repair or processing site. It should be mentioned that the ability to keep the structure as cool as possible, even during in-air friction stir welding, will result in a superior weld. Thus, the water serves the desired function of keeping the surrounding areas of the structure as cool as possible, with or without an evacuated air pocket around the crack repair or processing site.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

The invention claimed is:

1. A method for remotely repairing a crack using the principles of friction stir welding, said method comprising the steps of:
   1) providing a friction stir welding tool having a superabrasive coating thereon, a tool holder for the friction stir welding tool, a mobile spindle head assembly, and attaching means for attaching the mobile spindle head assembly to a material being friction stir welded, wherein the mobile spindle head assembly attaches to and moves along planar or curved surfaces, and a control system for controlling a depth of penetration of the friction stir welding tool into the material, and movement of the mobile spindle head assembly;
   2) attaching the mobile spindle head assembly to the material using the attaching means without clamping to an opposite side of the material to hold said material against said friction stir welding tool;
   3) remotely sending command signals to the control system instructing the friction stir welding tool to performing friction stir welding of the material; and
   4) moving the mobile spindle head assembly in order to perform crack repair of the material.

2. The method as defined in claim 1 wherein the method further comprises the step of providing a communications system for sending instructions to and receiving feedback from the control system, wherein the communications system is used for directing operation of the control system to thereby perform the crack repair in the material.

3. The method as defined in claim 2 wherein the method further comprises the steps of:
   1) providing a friction stir welding tool having a shank and a shoulder; and
   2) disposing a superabrasive material on at least a portion of the shoulder, wherein the superabrasive material is manufactured under an ultra high temperature and an ultra high pressure process.

4. The method as defined in claim 3 wherein the method further comprises the step of providing a pin disposed co-axially with the shank so as to extend outwardly from a shoulder surface.

5. The method as defined in claim 4 wherein the method further comprises the step of providing a short pin that is substantially close to the shoulder surface such that a broader area of the shoulder makes contact with the material than if the pin were longer.

6. The method as defined in claim 1 wherein the method further comprises the step of performing crack repair without the presence of a human operator to control the process, such that the crack repair can be performed in remote locations.

7. The method as defined in claim 6 wherein the method further comprises the step of performing crack repair in environments that are detrimental to a human operator.

* * * * *

UNITED STATES PATENT AND TRADEMARK OFFICE
CERTIFICATE OF CORRECTION

PATENT NO. : 7,225,968 B2 Page 1 of 1
APPLICATION NO. : 10/912736
DATED : June 5, 2007
INVENTOR(S) : Scott M. Packer et al.

It is certified that error appears in the above-identified patent and that said Letters Patent is hereby corrected as shown below:

The following priority information should be inserted on the cover page of the patent:

Related U.S. Application Data
(60)  Provisional application No. 60/492,374, filed on August 4, 2003.

Signed and Sealed this

Sixth Day of November, 2007

JON W. DUDAS
*Director of the United States Patent and Trademark Office*